US012472645B2

(12) United States Patent
Hsu et al.

(10) Patent No.: US 12,472,645 B2
(45) Date of Patent: *Nov. 18, 2025

(54) ROBOTIC TOOL CHANGER SYSTEM THROUGH MAGNETIC COUPLING FORCE AND ALL-ROUND MECHANICAL LOCKING

(71) Applicant: CHIEFTEK PRECISION CO., LTD., Tainan (TW)

(72) Inventors: Ming-Che Hsu, Tainan (TW); Syuan-Jyun Wu, Tainan (TW)

(73) Assignee: Chieftek Precision Co., Ltd., Tainan (TW)

( * ) Notice: Subject to any disclaimer, the term of this patent is extended or adjusted under 35 U.S.C. 154(b) by 685 days.

This patent is subject to a terminal disclaimer.

(21) Appl. No.: 17/872,500

(22) Filed: Jul. 25, 2022

(65) Prior Publication Data

US 2023/0405837 A1 Dec. 21, 2023

(30) Foreign Application Priority Data

May 18, 2022 (TW) .................................. 111118533

(51) Int. Cl.
*B25J 15/04* (2006.01)
*B23Q 3/157* (2006.01)
*B23Q 3/155* (2006.01)

(52) U.S. Cl.
CPC ....... *B25J 15/0441* (2013.01); *B25J 15/0433* (2013.01); *B25J 15/0491* (2013.01);
(Continued)

(58) Field of Classification Search
CPC ... Y10S 483/901; B25J 15/0491; B25J 15/04; B25J 15/0408; B25J 15/0425;
(Continued)

(56) References Cited

U.S. PATENT DOCUMENTS 11,130,243 B2    9/2021 Son
12,048,978 B2 *  7/2024 Hsu ..................... B25J 15/0491
(Continued)

FOREIGN PATENT DOCUMENTS

CN    106272508 A    1/2017
CN    111805280 A    10/2020
(Continued)

OTHER PUBLICATIONS

Machine Translation JP 05-177569, which JP '569 was published Jul. 1993.*

(Continued)

*Primary Examiner* — Erica E Cadugan
(74) *Attorney, Agent, or Firm* — Rosenberg, Klein & Lee

(57) ABSTRACT

A robotic tool changer system through magnetic coupling force and all-round mechanical locking includes a first coupling unit, a plurality of second coupling units, and a plurality of tool changer grippers. The first coupling unit is fixed to a robot arm. The first coupling unit includes a first locking unit and a first magnetic unit. Each second coupling unit is detachably connected to one of the tool changer grippers and includes a second locking unit and a second magnetic unit. When the first coupling unit is moved to approach one of the second coupling units at a predetermined distance, the first coupling unit and the second coupling unit are coupled to each other by a magnetic coupling force, then the first coupling unit and the second coupling unit are fixed to each other through all-round mechanical locking of the first locking unit and the second locking unit.

8 Claims, 20 Drawing Sheets

(52) U.S. Cl.
CPC .............. *B23Q 2003/15527* (2016.11); *B23Q 3/15553* (2013.01); *B25J 15/0425* (2013.01); *Y10S 483/901* (2013.01); *Y10S 901/41* (2013.01); *Y10T 483/1793* (2015.01)

(58) Field of Classification Search
CPC .............. B25J 15/0433; B25J 15/0441; Y10T 483/1809; B23Q 2003/15527; B23Q 3/15553
USPC ................................................... 483/901, 59
See application file for complete search history.

(56) References Cited

U.S. PATENT DOCUMENTS

| | | | |
|---|---|---|---|
| 2020/0009717 A1* | 1/2020 | Lee ........................ | B25J 9/0084 |
| 2021/0078186 A1* | 3/2021 | Son ....................... | B25J 15/0491 |
| 2022/0297316 A1* | 9/2022 | Lyhr Jensen ........ | B25J 15/0491 |

FOREIGN PATENT DOCUMENTS

| | | | |
|---|---|---|---|
| CN | 113276152 A | | 8/2021 |
| DK | 201900710 A1 | * | 11/2020 |
| JP | 05-177569 A | * | 7/1993 |
| JP | 2016-030320 A | * | 3/2016 |
| WO | WO2020249465 A1 | | 12/2020 |

OTHER PUBLICATIONS

Extended European Search Report mailed to Corresponding Patent Application No. 23174111.7-1002 on Oct. 13, 2023.

* cited by examiner

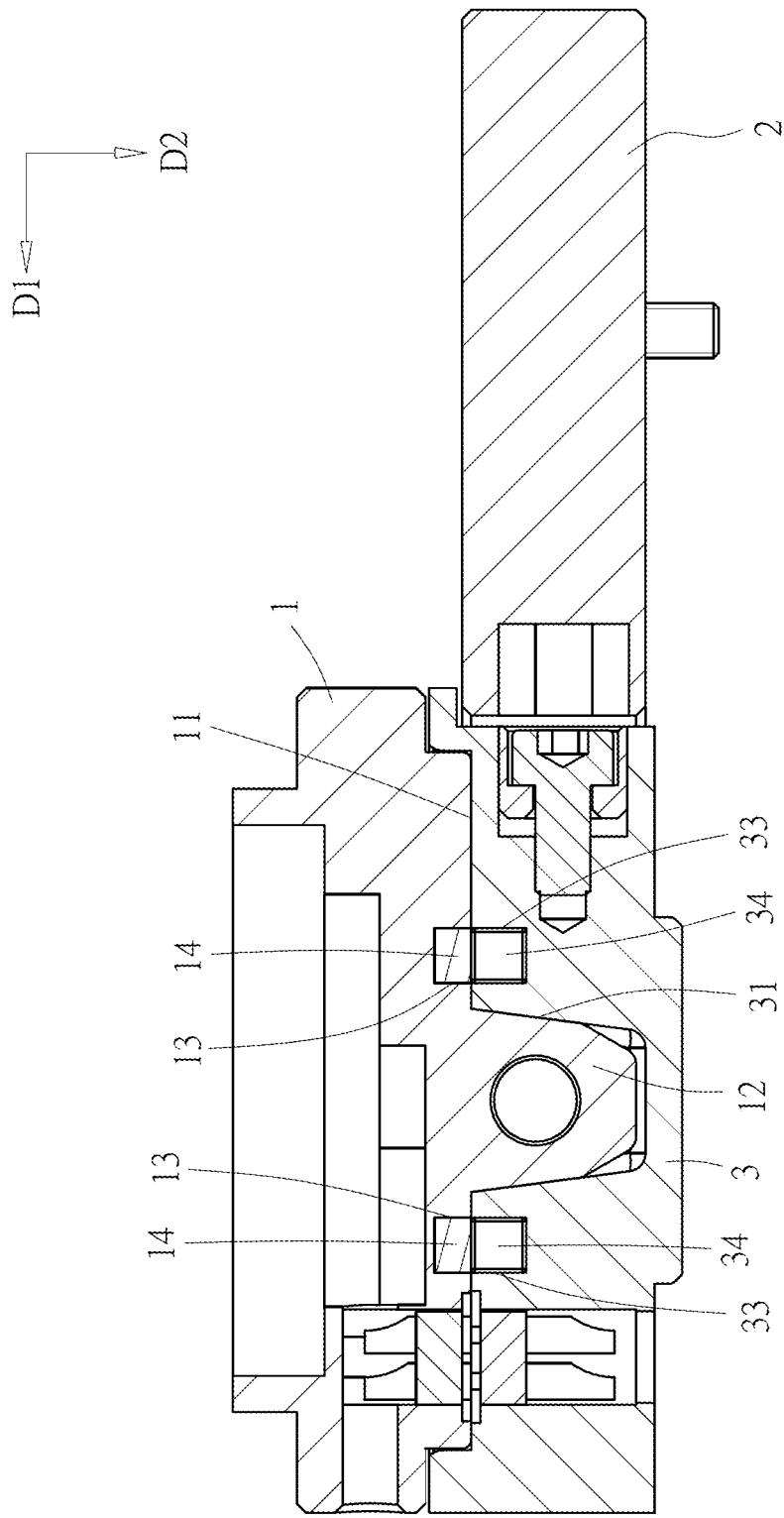
F I G. 12A

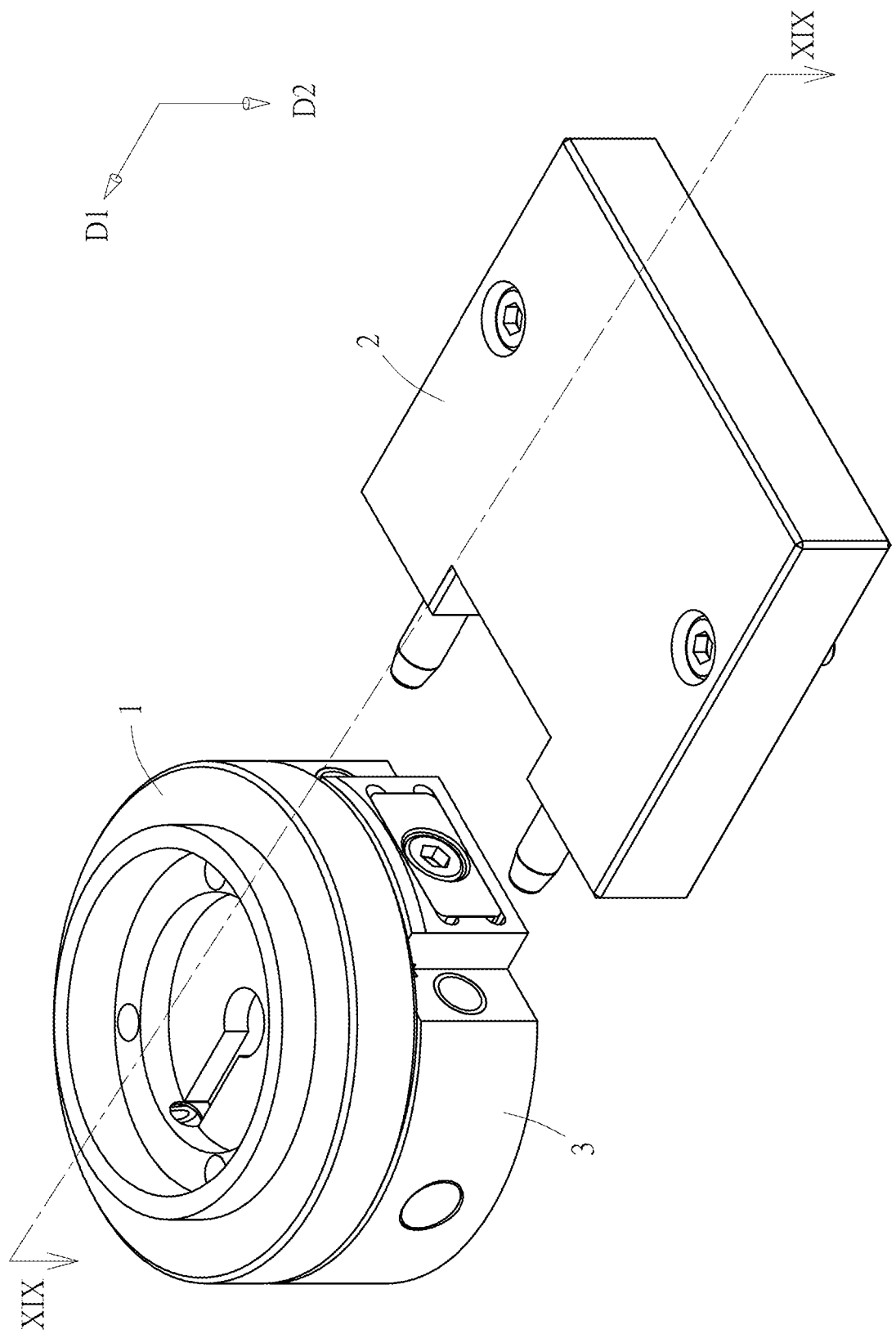
F I G. 16

ROBOTIC TOOL CHANGER SYSTEM THROUGH MAGNETIC COUPLING FORCE AND ALL-ROUND MECHANICAL LOCKING

FIELD OF THE INVENTION

The present invention relates to a robotic tool changer system through magnetic coupling force and all-round mechanical locking. Particularly, in the tool change process, a first coupling unit and a second coupling unit can be coupled to each other via a magnetic coupling force between a first magnetic unit and a second magnetic unit, which ensures that a first locking unit of the first coupling unit and a second locking unit of the second coupling unit can accurately complete all-round mechanical locking, so that the first coupling unit and the second coupling unit can be fixed to each other.

BACKGROUND OF THE INVENTION

When a machining apparatus is used to machine a workpiece, it is necessary to replace a tool according to the wear of the tool or different parts to be machined. In general, a machining robot adopts a robotic tool changer.

As disclosed in U.S. Patent No. U.S. Ser. No. 11/130, 243B2 titled "tool coupler, tool changer, tool mounter, and tool change system having the same" and PCT Publication No. WO2020249465A1 titled "tool changer for collaborative robots, a robot tool changer system and a method for connecting a tool to a robot arm", the direction in which the robot aim enters the tool changer gripper to connect the tool coupling unit is perpendicular to the direction in which the tool coupling unit is driven away from the tool changer gripper, so that the tool change can be performed in a small space.

As disclosed in U.S. Patent No. U.S. Ser. No. 11/130,243 B2, the tool changer 50 on the robot arm uses magnetism to connect the coupler 20 on the tool changer gripper 4 for tool change. Specifically, the tool changer 50 on the robot arm includes the magnetic module 70. The magnetic module 70 has the magnetic terminal 72. The magnetic terminal 72 is inserted into the recess 39 of the coupler 20 having the tool 3 on the tool changer gripper 4 to be attracted to the magnet module 40, so that the tool changer 50 and the coupler 20 are coupled to complete the tool change. However, the magnetic attraction does not have any retaining structure, so the coupler 20 may drop due to collision in the operation.

As disclosed in PCT Publication No. WO2020249465 A1, the first tool changer part 12 and the second tool changer part 14 are locked by mechanisms, such as the first locking element 28 and the second locking element 30, to complete the tool change. However, when the robot arm drives the first tool changer part 12 and the second tool changer part 14 to leave the device holder 44 and when the first locking element 28 and the second locking element 30 have not completely locked the first tool changer part 12 and the second tool changer part 14, the second tool changer part 14 may be misaligned with the first tool changer part 12 due to factors, such as vibration or unstable clamping. As a result, the first locking element 28 and the second locking element 30 cannot accurately lock the first tool changer part 12 and the second tool changer part 14. As disclosed in PCT Publication No. WO2020249465 A1, the solution is that the robot arm continuously exerts a force different from the direction of the force of the first locking element 28 and the second locking element 3 to the first tool changer part 12 and the second tool changer part 14, such that the first tool changer part 12 and the second tool changer part 14 can be aligned and coupled precisely in the tool change process.

SUMMARY OF THE INVENTION

The primary object of the present invention is to provide a robotic tool changer system through magnetic coupling force and all-round mechanical locking, comprising a first coupling unit, a plurality of second coupling units, and a plurality of tool changer grippers. The first coupling unit is fixed to a robot arm end shaft and moved along with the robot arm end shaft. The first coupling unit includes a first guide unit, a first locking unit and a first magnetic unit. Each second coupling unit is connected with a tool. Each second coupling unit includes a second guide unit, a second locking unit and a second magnetic unit. Each second coupling unit is detachably connected to a corresponding one of the tool changer grippers.

When the first coupling unit is moved to approach a selected one of the second coupling units at a predetermined distance, the first guide unit and the second guide unit jointly guide the first coupling unit and the selected second coupling unit to be aligned and engaged with each other. The first magnetic unit and the second magnetic unit are attracted to each other via magnetism within the predetermined distance to have a magnetic coupling force. The first coupling unit and the selected second coupling unit are coupled to each other by the magnetic coupling force. Under the action of the magnetic coupling force, the first coupling unit and the selected second coupling unit are fixed to each other through all-round mechanical locking of the first locking unit and the second locking unit.

Preferably, the first magnetic unit and the second magnetic unit are magnets, or, one of the first magnetic unit and the second magnetic unit is a magnet and the other one of the first magnetic unit and the second magnetic unit is a magnetically sensitive member.

Preferably, the first guide unit is a protruding portion. The protruding portion has a first guide hole extending along a third direction. The first locking unit includes a first ejector pin disposed in the first guide hole. The first ejector pin has a first acting force. The second guide unit is a groove corresponding to the protruding portion. The second locking unit includes a second ejector pin and a guide lock. The second ejector pin is movably disposed in each second coupling unit in the third direction. The guide lock is movably disposed in each second coupling unit in a first direction. The guide lock is configured to move the second ejector pin to extend out of the groove or to retract into the groove. When the robot arm end shaft drives the first coupling unit to approach the selected second coupling unit in a second direction, the protruding portion is mated with the groove so that the first coupling unit and the selected second coupling unit are aligned and engaged with each other. The first magnetic unit and the second magnetic unit generate the magnetic coupling force in the second direction to be coupled to each other. When the robot arm end shaft pulls the first coupling unit and the selected second coupling unit to move away from the corresponding the tool changer gripper along the first direction, an included angle is defined between the first direction and the second direction. The guide lock applies a second acting force to overcome the first acting force to drive the second ejector pin to push the first ejector pin, and the second ejector pin extends into the first guide hole to form the all-round mechanical locking for the first coupling unit and the selected second coupling unit to be fixed to each other.

Preferably, the tool changer grippers each include a third force-applying member and at least one protruding post. When the robot arm end shaft drives the first coupling unit and the selected second coupling unit to move along the first direction toward the corresponding tool changer gripper, the protruding post pushes the guide lock to overcome the second acting force, the first ejector pin pushes the second ejector pin via the first acting force so that the second ejector pin is retracted into the groove to release the all-round mechanical locking. The third force-applying member applies a third acting force to the selected second coupling unit, so that the selected second coupling unit is held by the corresponding tool changer gripper. The first coupling unit is moved away from the selected second coupling unit along the second direction.

Preferably, the first acting force, the second acting force and the third acting force are an elastic force or a magnetic force.

Preferably, each second coupling unit has at least one guide lock groove to accommodate the guide lock and a second force-applying member. The guide lock has a concave portion and a guide slope. The second ejector pin has a second ejector pin slope corresponding to the guide slope. When the selected second coupling unit is moved away from the corresponding tool changer gripper, the second force-applying member applies the second acting force to drive the guide lock. Through cooperation of the guide slope and the second ejector pin slope, the second ejector pin extends out of the groove to overcome the first acting force and to extend into the first guide hole. When the selected second coupling unit is moved toward the corresponding tool changer gripper, the protruding post extends into the guide lock groove, the protruding post pushes the guide lock to overcome the second acting force, and the first ejector pin pushes the second ejector pin via the first acting force to move toward the concave portion, so that the second ejector pin is disengaged from the first guide hole and retracted into the groove. Preferably, a first force-applying member in provided in the first guide hole. The first force-applying member applies the first acting force to the first ejector pin.

Preferably, the first coupling unit includes a first contact surface. The first contact surface has a first recess. The first magnetic unit is embedded in the first recess. The first magnetic unit is flush with the first contact surface. The second coupling unit includes a second contact surface. The second contact surface has a second recess. The second magnetic unit is embedded in the second recess. The second magnetic unit is flush with the second contact surface Preferably, the direction of the magnetic coupling force is different from the direction of the all-round mechanical locking.

According to the above technical features, the present invention can achieve the following effects:

1. In the tool change process, the first coupling unit and the second coupling unit can be coupled to each other via the magnetic coupling force between the first magnetic unit and the second magnetic unit, so as to achieve the magnetic guiding and positioning effect, so that the second coupling unit can be disengaged from the tool changer gripper in a stable manner, without shaking or vibration. This ensures that the first locking unit of the first coupling unit and the second locking unit of the second coupling unit can accurately complete all-round mechanical locking, so that the first coupling unit and the second coupling unit can be fixed to each other. With the magnetic coupling force, there is no need for the first coupling unit to continue to exert a force for coupling and aligning the second coupling unit.
2. According to requirements, the magnetism configuration of the first magnetic unit and the second magnetic unit can be configured according to the weight of the second coupling unit and the tool.
3. Both the first magnetic unit and the second magnetic unit may be magnets, alternatively, one of them may be a magnet, and the other may be a magnetically sensitive member.

BRIEF DESCRIPTION OF THE DRAWINGS

FIG. 12A is a schematic view of the second coupling unit held by the tool changer gripper and the first coupling unit coupled with the second coupling unit by means of the magnetic coupling force between the first magnetic unit and the second magnetic unit according to the embodiment of the present invention;

FIG. 16 is a perspective view according to the embodiment of the present invention, illustrating that the robot arm end shaft drives the first coupling unit and the second coupling unit to completely disengage from the tool changer gripper;

DESCRIPTION OF THE PREFERRED EMBODIMENTS

Embodiments of the present invention will now be described, by way of example only, with reference to the accompanying drawings.

For ease of understanding, in the description of the following embodiments, the term "coupled" is used to describe the connection relationship caused by "magnetism", and the term "fixed" is used to describe the fixed relationship caused by "all-round mechanical locking".

Magnetic coupling force: the coupling force is generated by the magnetic attraction effect.

Coupled: the connection relationship between two objects through the magnetic coupling force. "Coupled" means that two objects are connected via magnetism, and the two objects won't be separated easily.

All-round mechanical locking: through the selective connection between two objects, the two objects have restrictions on the degrees of freedom, including the restrictions on all translation degrees of freedom and all rotation degrees of freedom of the two objects, so that the two objects are fixed to each other without any relative displacement and relative rotation.

Fixed: the stable connection relationship between two objects is produced by all-round mechanical locking. The all-round mechanical locking can be selectively performed and selectively released. Before the all-round mechanical locking is released, the two objects are fixed and won't be separated from each other.

Figure 1:
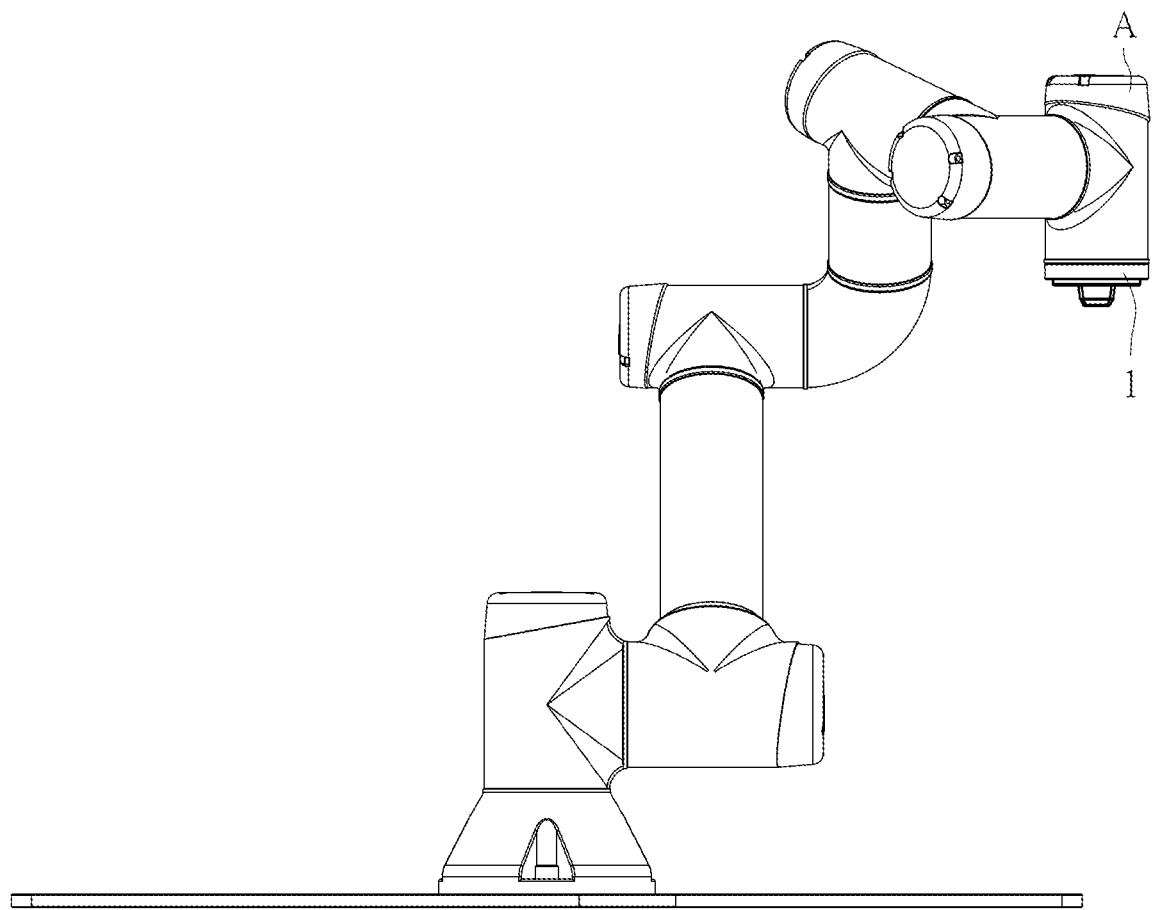
FIG. 1 is a side view of the robot arm end shaft coupled with the first coupling unit according to an embodiment of the present invention.
Figure 2:
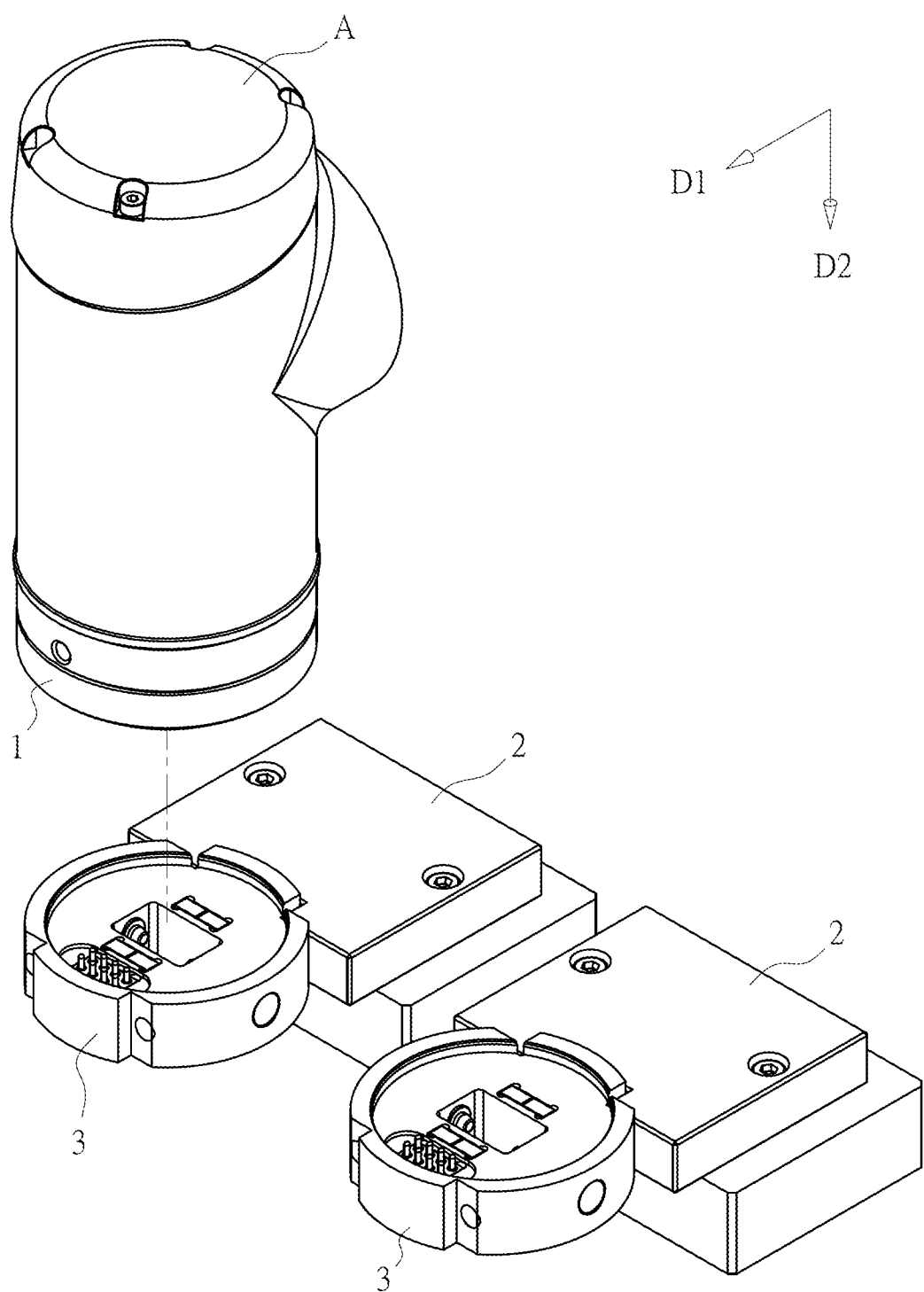
FIG. 2 is a perspective view according to the embodiment of the present invention, illustrating that the first coupling unit is driven by the robot arm end shaft to be aligned with a corresponding one of the second coupling units on the tool changer grippers.
Figure 3:
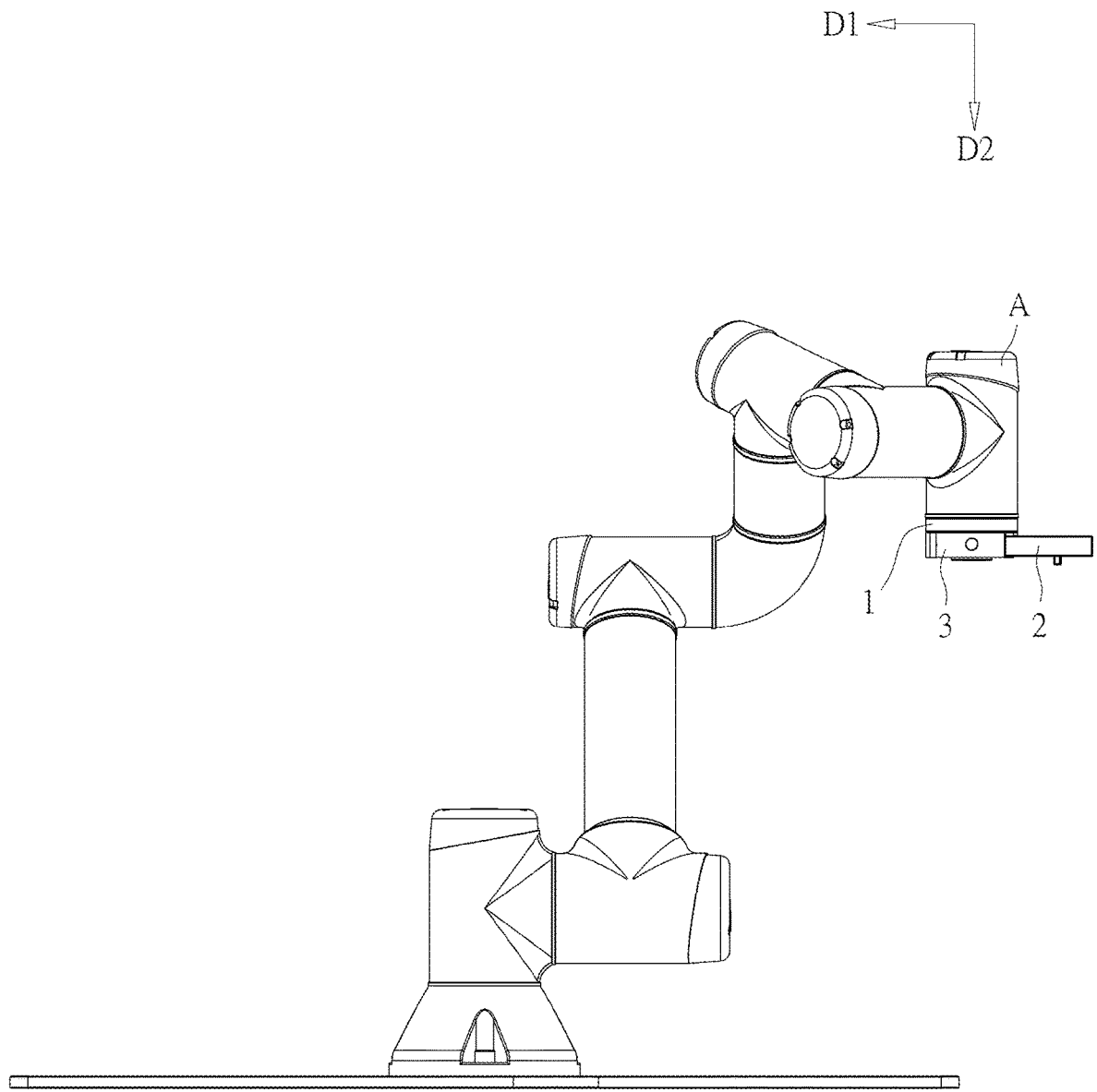
FIG. 3 is a side view according to the embodiment of the present invention, illustrating that the first coupling unit driven by the robot arm end shaft is coupled with the second coupling unit.

As shown in FIG. 1, a robotic tool changer system through magnetic coupling force and all-round mechanical locking of the present invention is implemented by a robot arm end shaft A. Specifically, the robot arm end shaft A is coupled with a first coupling unit 1, or the first coupling unit 1 extends out from the robot arm end shaft A. For example, the first coupling unit 1 is formed on the robot arm end shaft A. The first coupling unit 1 of this embodiment is coupled to the robot arm end shaft A. Referring to FIG. 2 and FIG. 3, the robot arm end shaft A performs a tool change in a tool magazine through the first coupling unit 1. The tool magazine has a plurality of tool changer grippers 2. FIG. 2 illustrates two tool changer grippers 2 as an example. A second coupling unit 3 is detachably connected to each tool changer gripper 2. For example, a machining tool is fixed to the second coupling unit 3. (The method for the tool to be coupled to the second coupling unit 3 may adopt the coupling method of the conventional tool changer, and the tool is not shown in the figures). The robot arm end shaft A is operated to approach the tool changer gripper 2 in a second direction D2 for the first coupling unit 1 to be coupled with the second coupling unit 3. Then, the robot arm end shaft A takes out the second coupling unit 3 coupled with the coupling unit 1 from the tool changer gripper 2 along a first direction D1, so that the first coupling unit 1 and the second coupling unit 3 are coupled to each other to complete the tool change.

Figure 4:
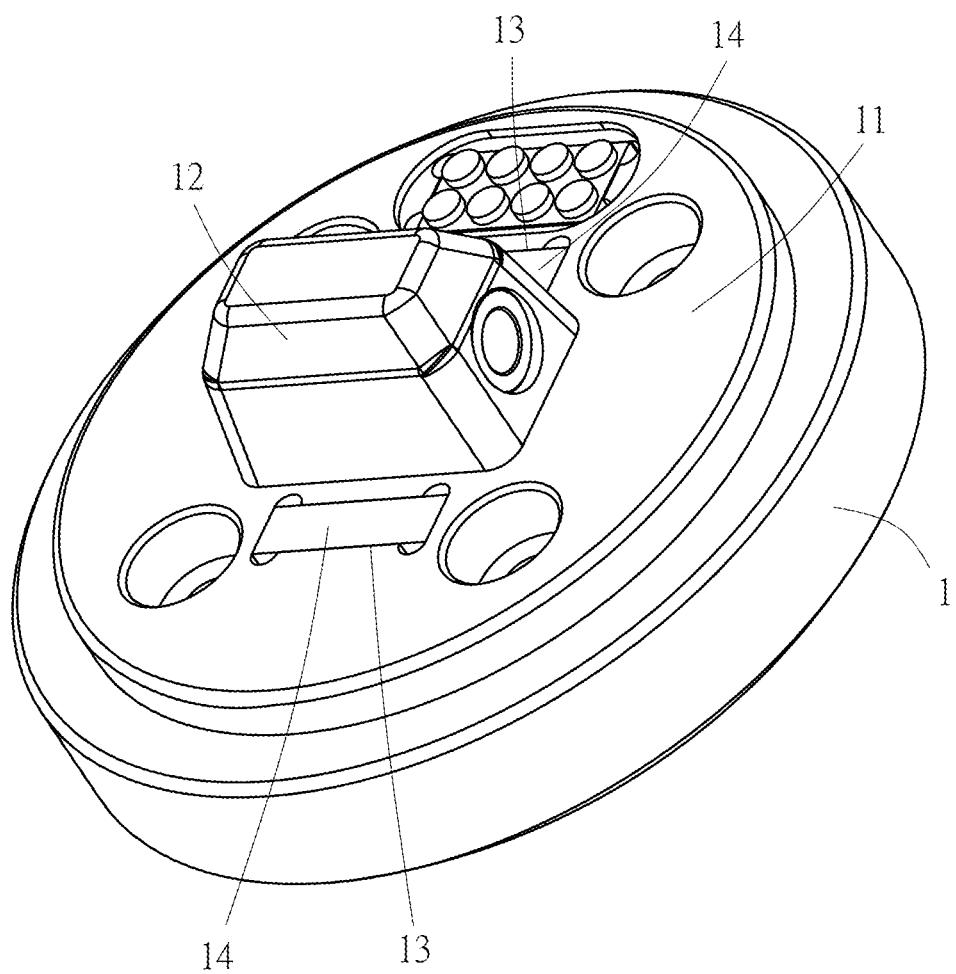
FIG. 4 is a perspective view of the first coupling unit according to the embodiment of the present invention.
Figure 5:
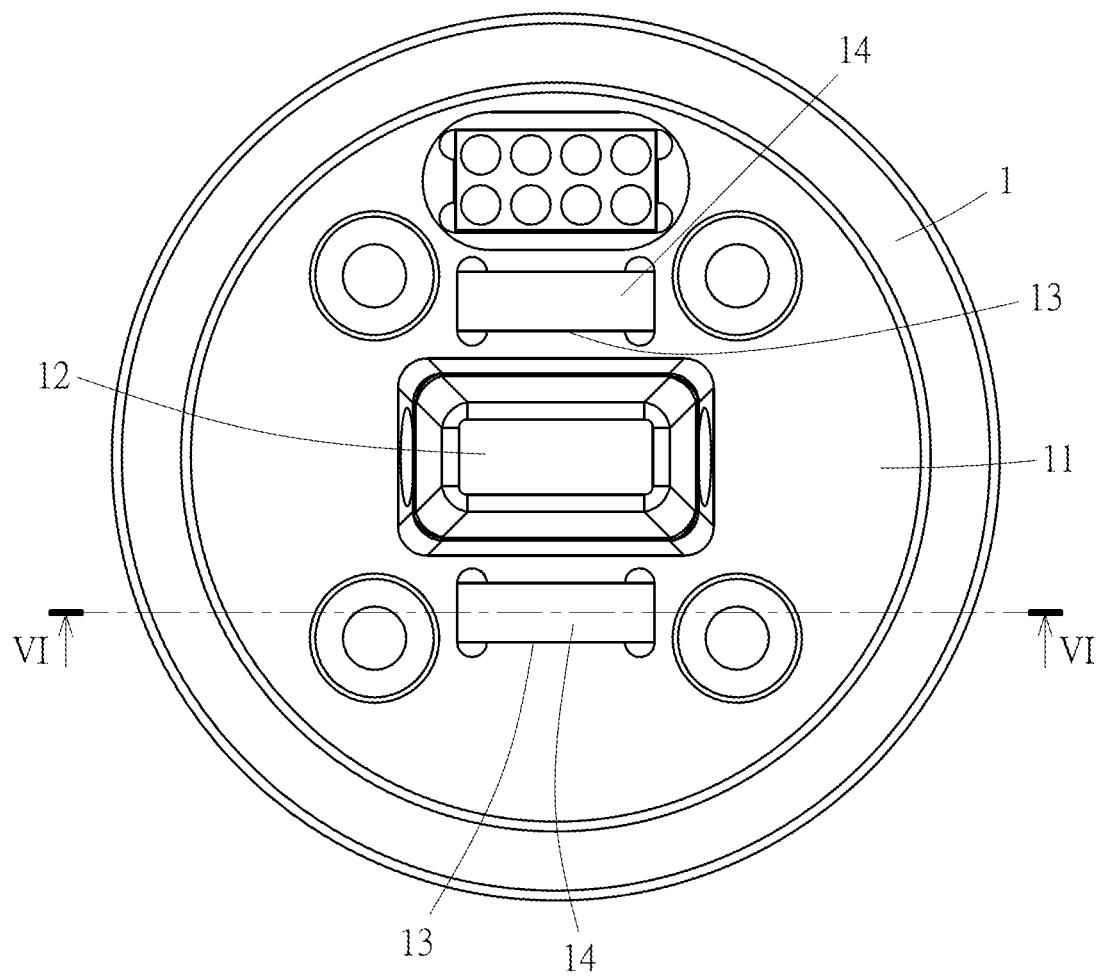
FIG. 5 is a schematic view of the first contact surface of the first coupling unit according to the embodiment of the present invention.
Figure 6:
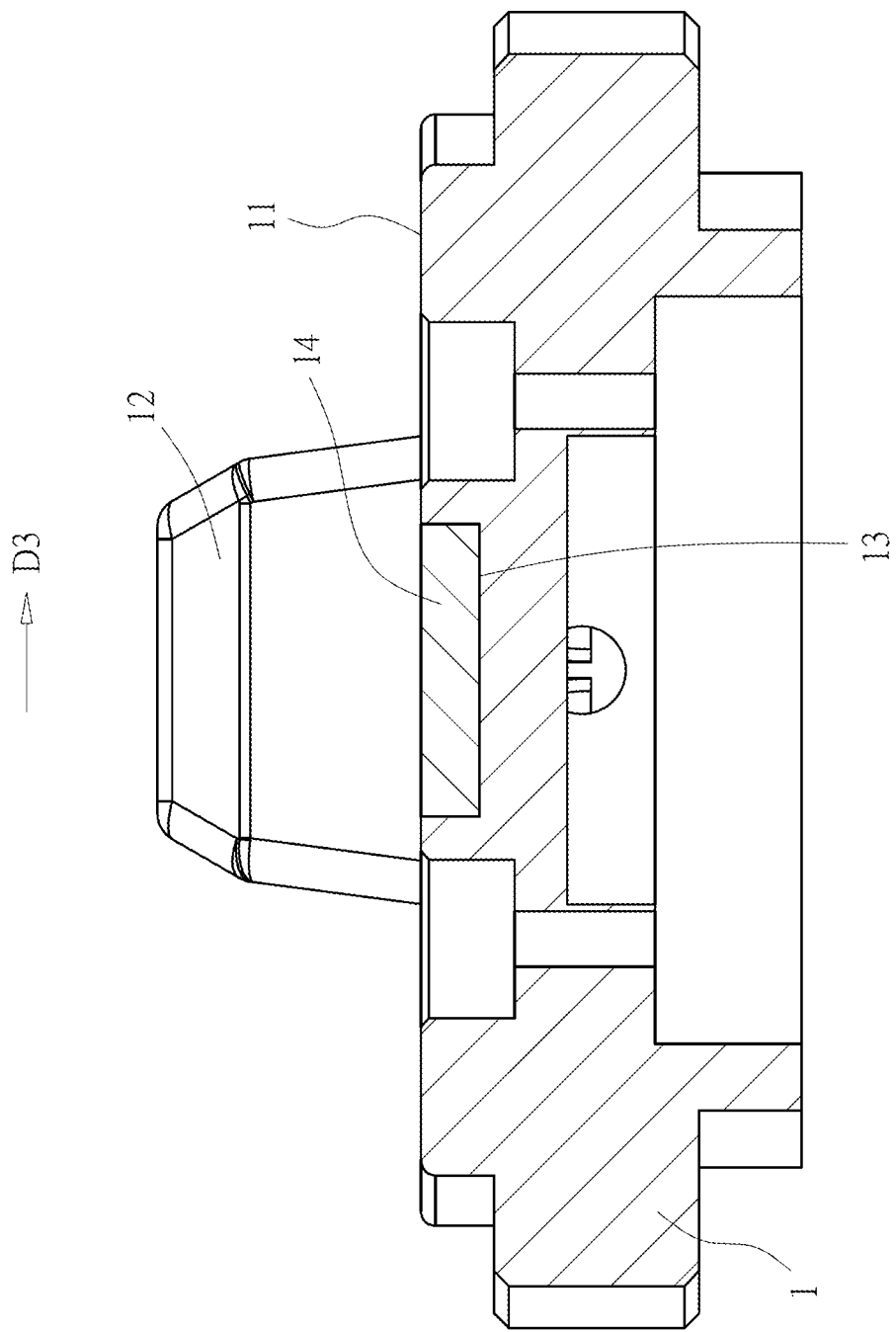
FIG. 6 is a cross-sectional view taken along line VI-VI of FIG. 5.

Referring to FIGS. 4-6, the first coupling unit 1 includes a first contact surface 11. A first guide unit is provided on the first contact surface 11. In this embodiment, the first guide unit is a protruding portion 12. The protruding portion 12 extends along a third direction D3. The first contact surface 11 has two first recesses 13. The two first recesses 13 are located on opposite sides of the protruding portion 12, respectively. A first magnetic unit 14 is embedded in each first recess 13. The first magnetic unit 14 is flush with the first contact surface 11.

Figure 7:
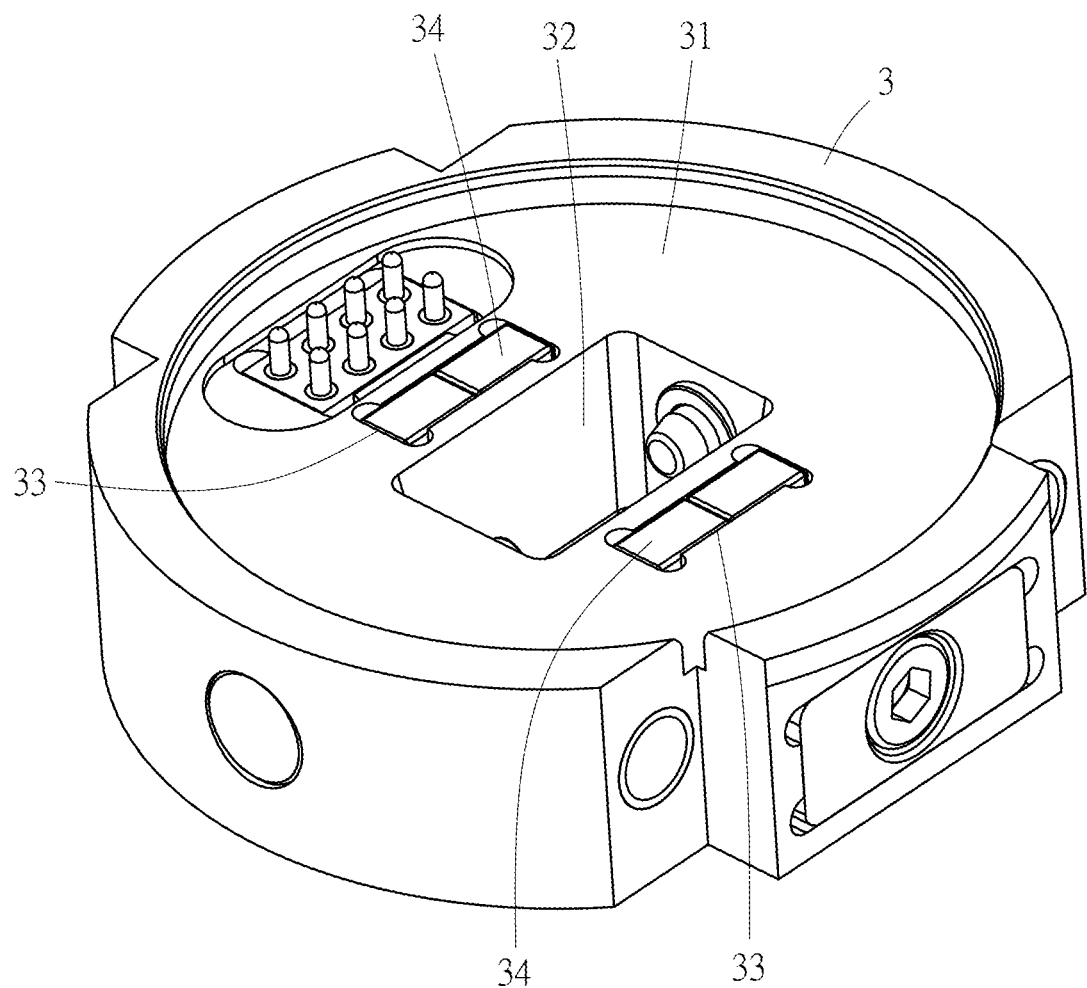
FIG. 7 is a perspective view of the second coupling unit according to the embodiment of the present invention.
Figure 8:
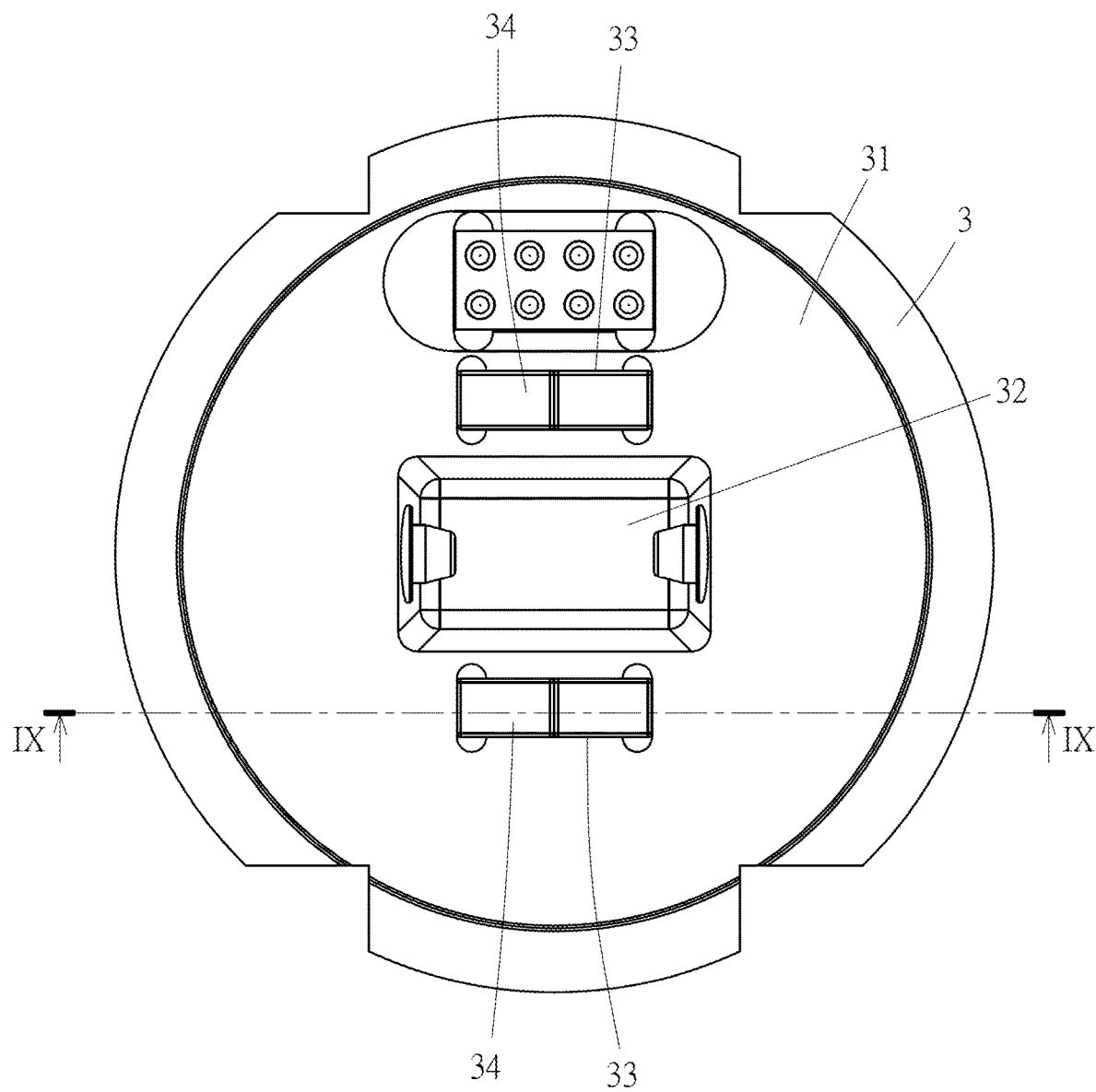
FIG. 8 is a schematic view of the second contact surface of the second coupling unit according to the embodiment of the present invention.
Figure 9:
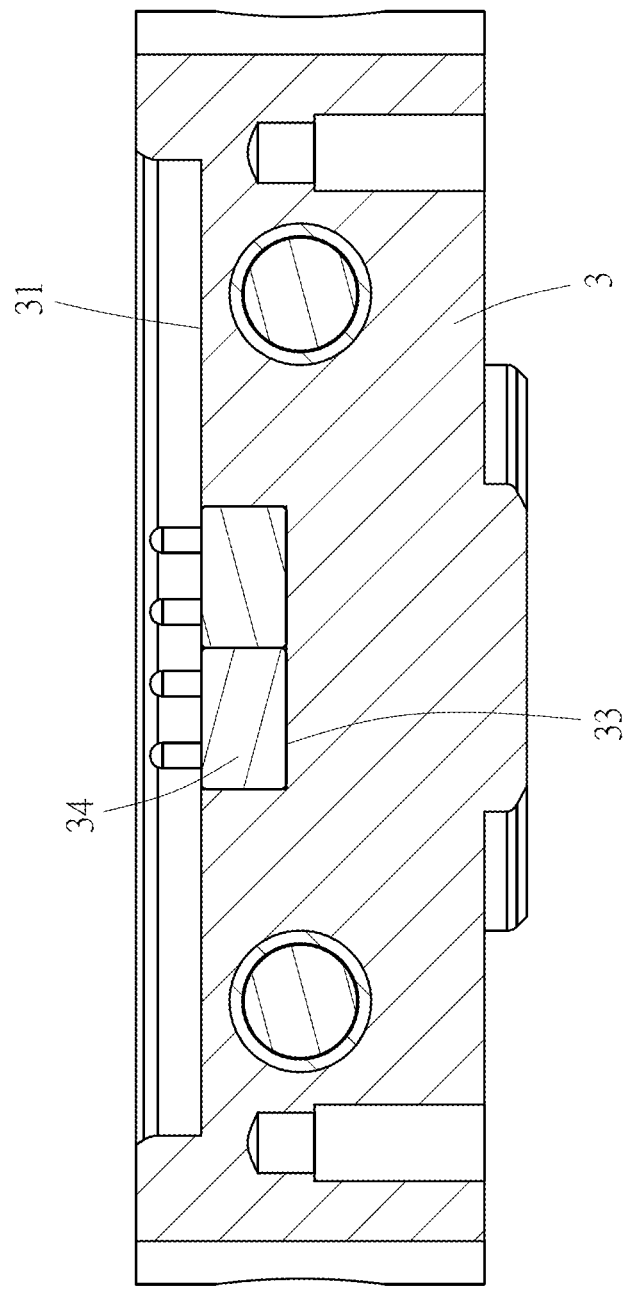
FIG. 9 is a cross-sectional view taken along line Dc-a of FIG. 8.

Referring to FIGS. 7-9, the second coupling unit 3 includes a second contact surface 31. A second guide unit is provided on the second contact surface 31. In this embodiment, the second guide unit is a groove 32 corresponding to the protruding portion 12. The second contact surface 31 has two second recesses 33. The two second recesses 33 are located on opposite sides of the groove 32, respectively. A second magnetic unit 34 is embedded in each second recess 33. The second magnetic unit 34 is flush with the second contact surface 31.

Figure 10:
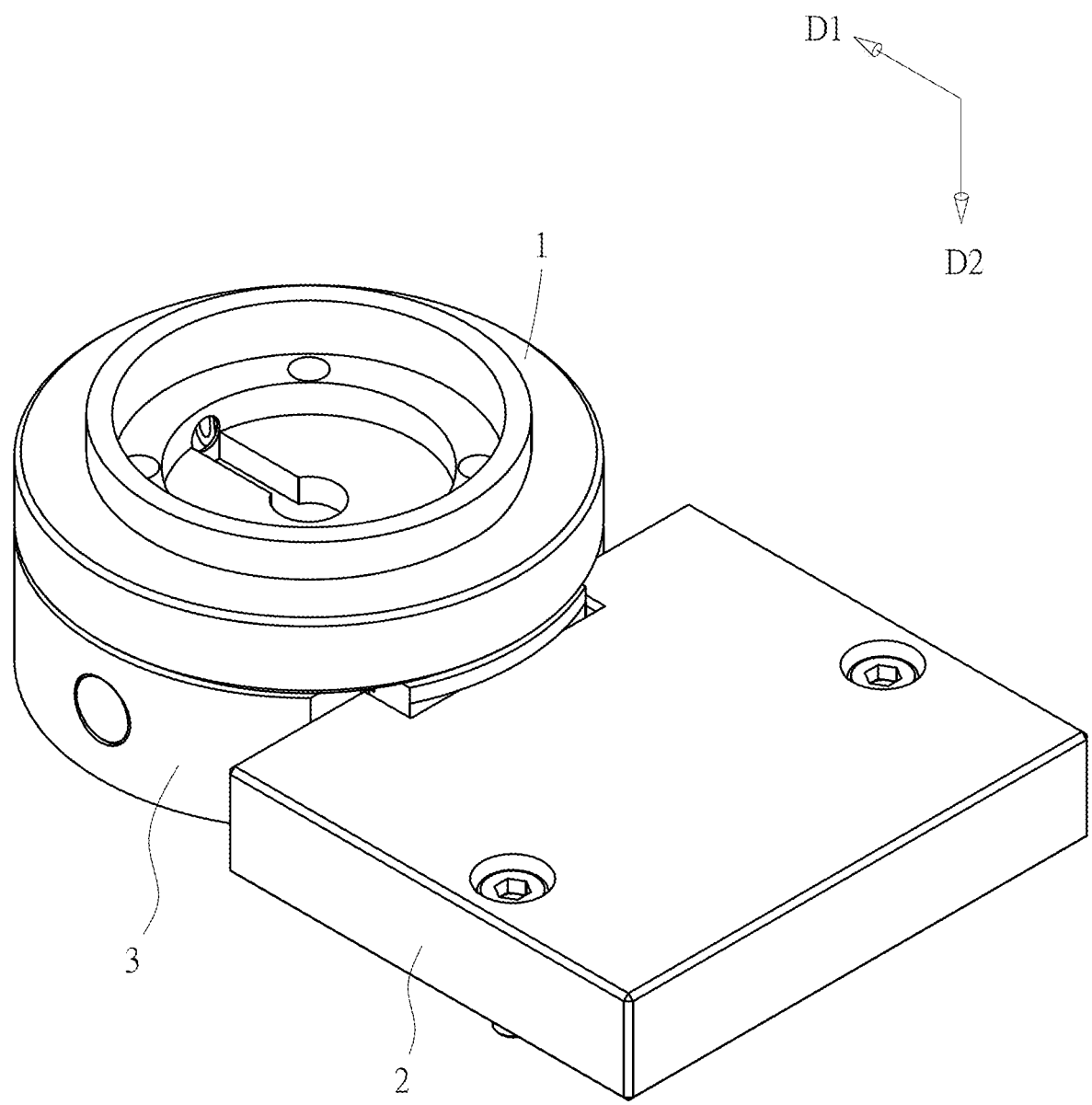
FIG. 10 is a perspective view of the second coupling unit held by the tool changer gripper and the first coupling unit coupled with the second coupling unit according to the embodiment of the present invention.
Figure 11:
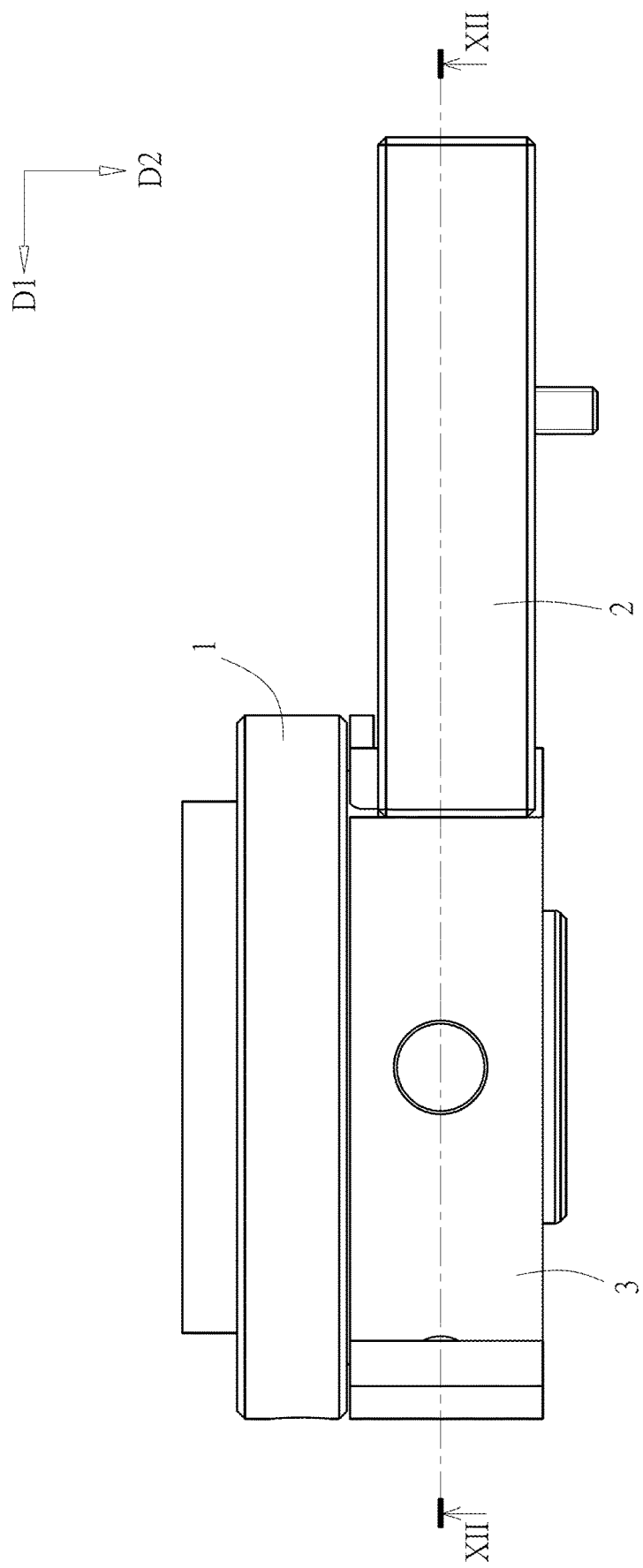
FIG. 11 is a side view of the second coupling unit held by the tool changer gripper and the first coupling unit coupled with the second coupling unit according to the embodiment of the present invention.
Figure 12:
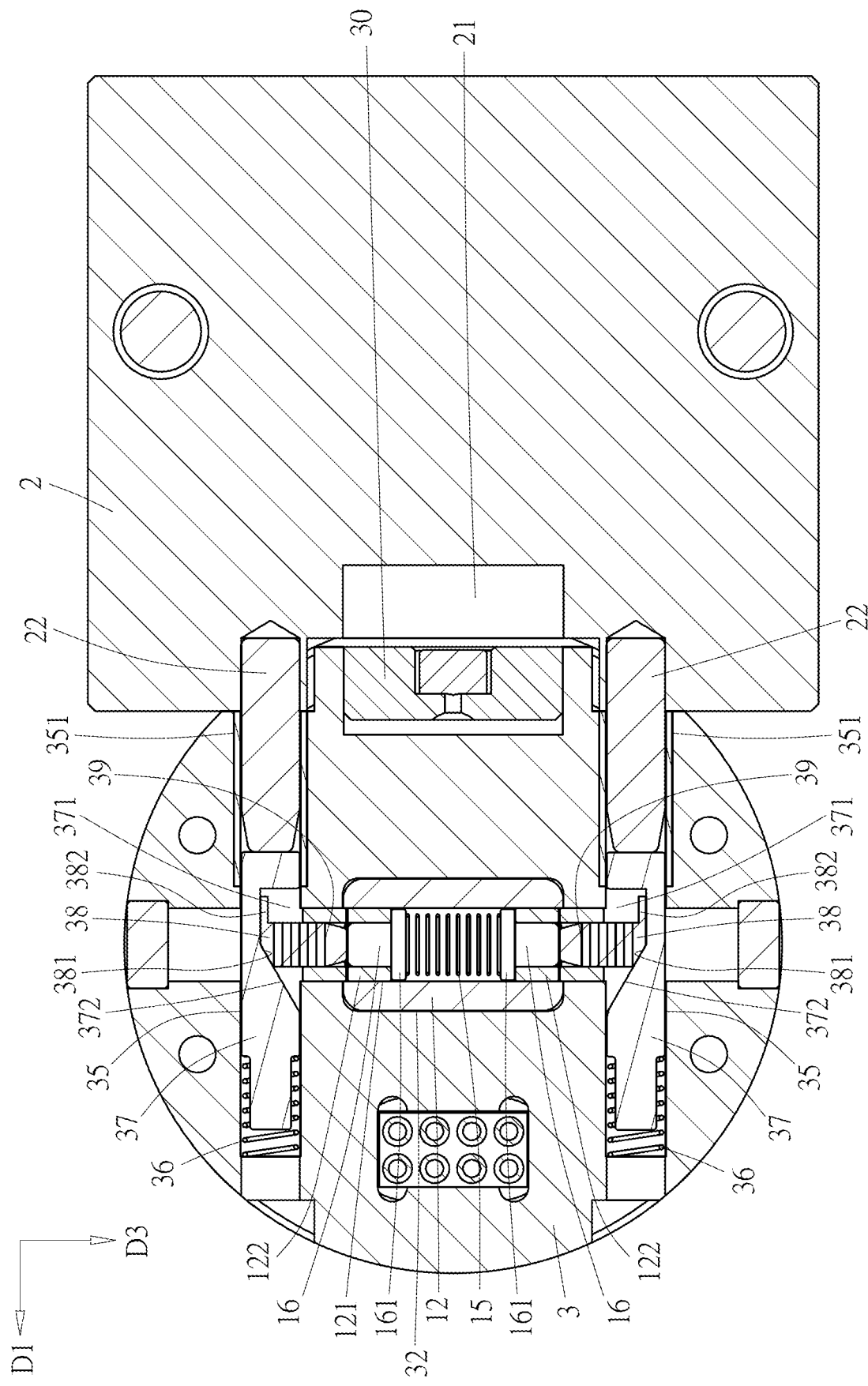
FIG. 12 is a cross-sectional view of the second coupling unit held by the tool changer gripper and the first coupling unit coupled with the second coupling unit according to the embodiment of the present invention.

Referring to FIGS. 10 to 12, when the robot arm end shaft (not shown in the drawings) drives the first coupling unit 1 to approach the second coupling unit 3 at a predetermined distance (in this embodiment, the height of the protruding portion 12), the protruding portion 12 is inserted into the groove 32, and the first contact surface 11 of the first coupling unit 1 is in contact with the second contact surface 31 of the coupling unit 3, so that the first coupling unit 1 and the second coupling unit 3 are aligned and engaged with each other. The first magnetic unit 14 and the second magnetic unit 34 are attracted to each other via magnetism within the predetermined distance to have a magnetic coupling force. The first coupling unit 1 and the second coupling unit 3 are coupled to each other in the second direction D2 via the magnetic coupling force (as shown in FIG. 12A). Under the action of the magnetic coupling force, the first coupling unit 1 and the second coupling unit 3 are fixed to each other through a first locking unit on the first coupling unit 1 and a second locking unit on the second coupling unit 3 to perform an all-round mechanical locking. In detail, the protruding portion 12 has a first guide hole 121 extending along the third direction D3. A first force-applying member 15 is provided in the middle section of the first guide hole 121. The first locking unit includes a first ejector pin 16 disposed at either end of the first guide hole 121. The first ejector pin 16 is against the first force-applying member 15, so that the first force-applying member 15 applies a first acting force to the first ejector pin 16. One end of the first ejector pin 16 has an ejector pin flange 161. A sleeve 122 is fixed to either end of the first guide hole 121. The ejector pin flange 161 is against the sleeve 122, such that the first ejector pin 16 won't come out of the first guide hole 121. Each of two opposite sides of the second coupling unit 3 is recessed with a guide lock groove 35 in the first direction D1. The guide lock groove 35 has an opening 351. A second force-applying member 36 is provided in the guide lock groove 35. The second locking unit includes a guide lock 37 that is disposed in the guide lock groove 35 and is against the second force-applying member 36. The second locking unit further includes a second ejector pin 38 in the third direction D3. The second ejector pin 38 can be extended to either side of the groove 32 or retracted into the second coupling unit 3. Specifically, the guide lock 37 has a concave portion 371 and a guide slope 372. The second ejector pin 38 has a second ejector pin slope 381 corresponding to the guide slope 372 of the guide lock 37. A spring 39 is sleeved on the second ejector pin 38. The spring 39 provides a force for the second ejector pin 38 to be retracted into the second coupling unit 3. A blocking rim 382 is provided at one end of the second ejector pin 38 away from the groove 32. The blocking rim 382 is against the guide lock groove 35 to restrict the second ejector pin 38 from extending to the extreme position of the groove 32. The second force-applying member 36 applies a second acting force to the second ejector pin 38 for the second ejector pin 38 to extend out of the groove 32 through the cooperation of the guide slope 372 and the second ejector pin slope 381. In this embodiment, the first force-applying member 15 and the second force-applying member 36 are elastic members, but not limited thereto. For example, they may be magnetic members.

The tool changer gripper 2 includes a third force-applying member 21 to provide a third acting force and a protruding post 22 corresponding to the guide lock groove 35. When the second coupling unit 3 is held by the tool changer gripper 2, the protruding post 22 of the tool changer gripper 2 extends into the guide lock groove 35 of the second coupling unit 3 from the opening 351 and push the guide lock 37 to overcome the second acting force, so that the second ejector pin 38 is located in the concave portion 371 and retracted in the second coupling unit 3. In this embodiment, the third force-applying member 21 is a magnetic member, and the second coupling unit 3 has a corresponding magnetically sensitive member 30. The third acting force is a magnetic force of the magnetic member. Through the third acting force acting on the magnetically sensitive member 30, the second coupling unit 3 can be held on the tool changer gripper 2 by the third acting force. With the third acting force, in the tool change process, before the second coupling unit 3 completely leaves the tool changer gripper 2, the third acting force continues to be applied to the second coupling unit 3 to prevent the second coupling unit 3 from dropping. Similarly, when the second coupling unit 3 enters the tool changer gripper 2, the third acting force can keep exerting force on the second coupling unit 3 to prevent the second coupling unit 3 from dropping in the tool change process.

Figure 13:
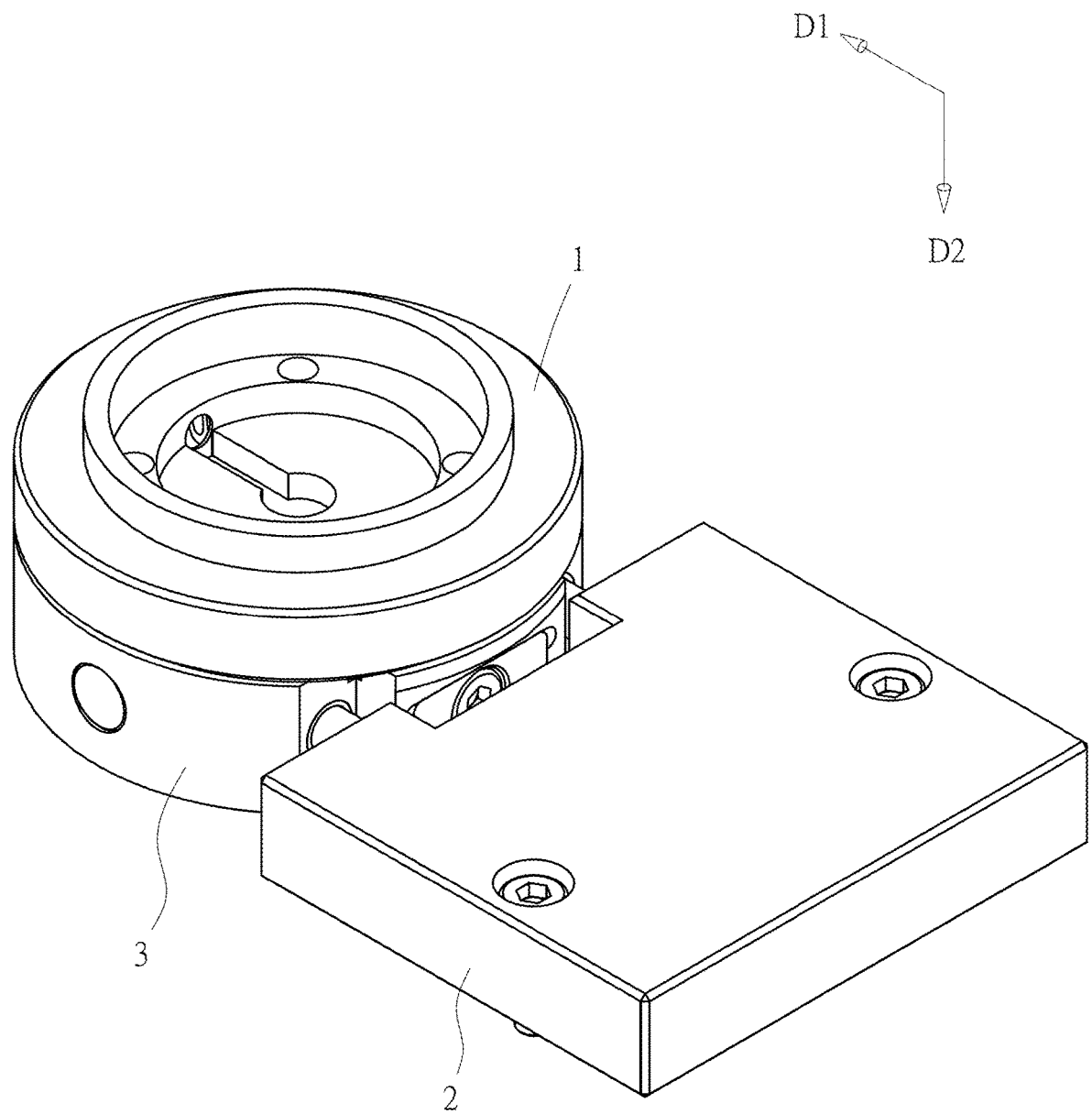
FIG. 13 is a perspective view according to the embodiment of the present invention, illustrating that the robot arm end shaft drives the first coupling unit and the second coupling unit to disengage from the tool changer gripper.
Figure 14:
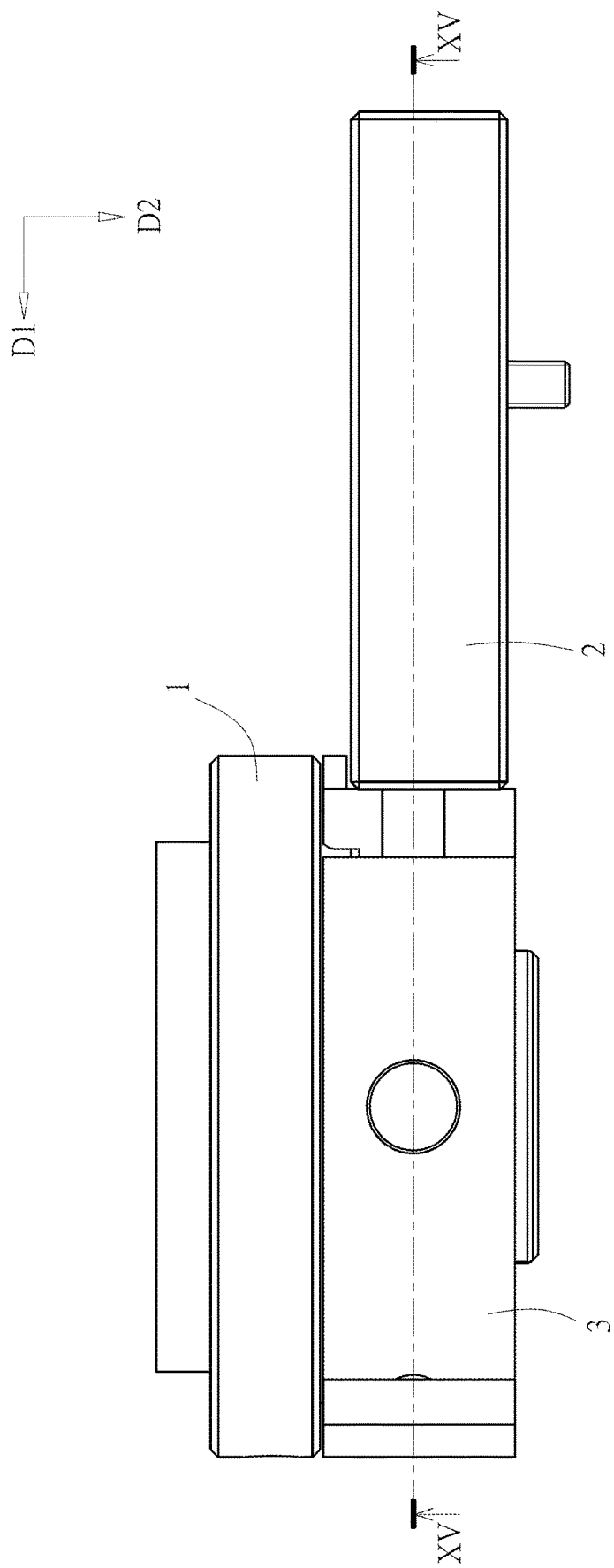
FIG. 14 is a side view according to the embodiment of the present invention, illustrating that the robot arm end shaft drives the first coupling unit and the second coupling unit to disengage from the tool changer gripper.
Figure 15:
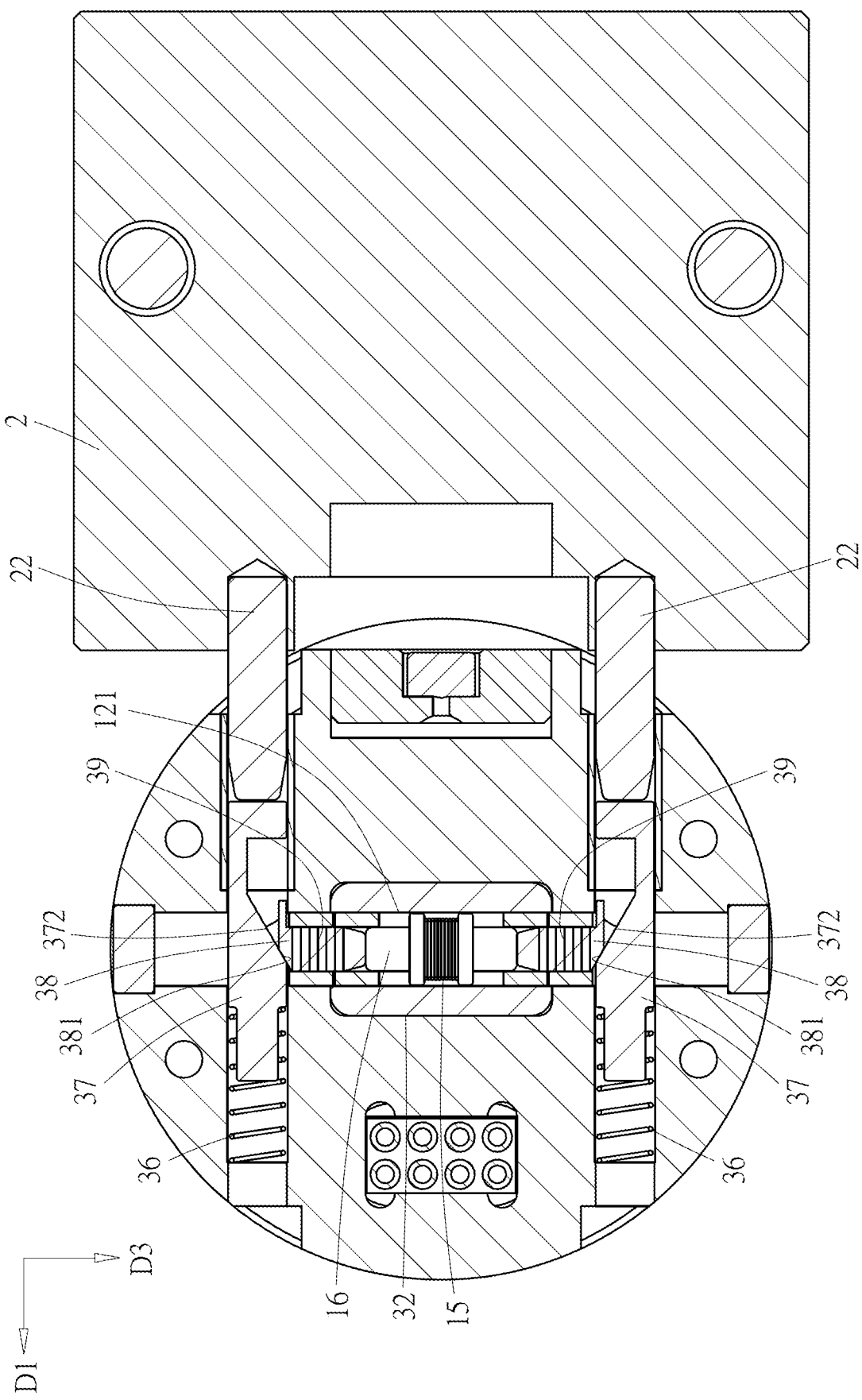
FIG. 15 is a cross-sectional view according to the embodiment of the present invention, illustrating that the robot arm end shaft drives the first coupling unit and the second coupling unit to disengage from the tool changer gripper.

Referring to FIG. 12A, FIG. 13 and FIG. 15, when the robot arm end shaft A pulls the first coupling unit 1 and the second coupling unit 3 along the first direction D1 to be gradually disengaged from the tool changer gripper 2, the second coupling unit 3 is gradually disengaged from the protruding post 22 of the tool changer gripper 2, and the second force-applying member 36 applies the second acting force to the guide lock 37. The second acting force is greater than the force applied by the spring 39 to the second ejector pin 38 and the first acting force applied by the first force-applying member 15 to the first ejector pin 16. Thus, through the cooperation of the guide slope 372 of the guide lock 37 and the second ejector pin slope 381 of the second ejector pin 38, the second ejector pin 38 extends from the groove 32 into the first guide hole 121. At this time, the protruding portion 12 of the first coupling unit 1 is completely engaged in the groove 32 of the second coupling unit 3, and the two second ejector pins 38 of the second coupling unit 3 completely extend into the first guide holes 121 of the first coupling unit 1 from both sides. Through this mechanical connection, the first coupling unit 1 and the second coupling unit 3 are mechanically fixed, that is, there is no translation degree of freedom between the first coupling unit 1 and the second coupling unit 3, and there is no any rotational degree of freedom, forming an all-round mechanical locking. Thus, the first coupling unit 1 and the second coupling unit 3 are fixed to each other.

Figure 17:
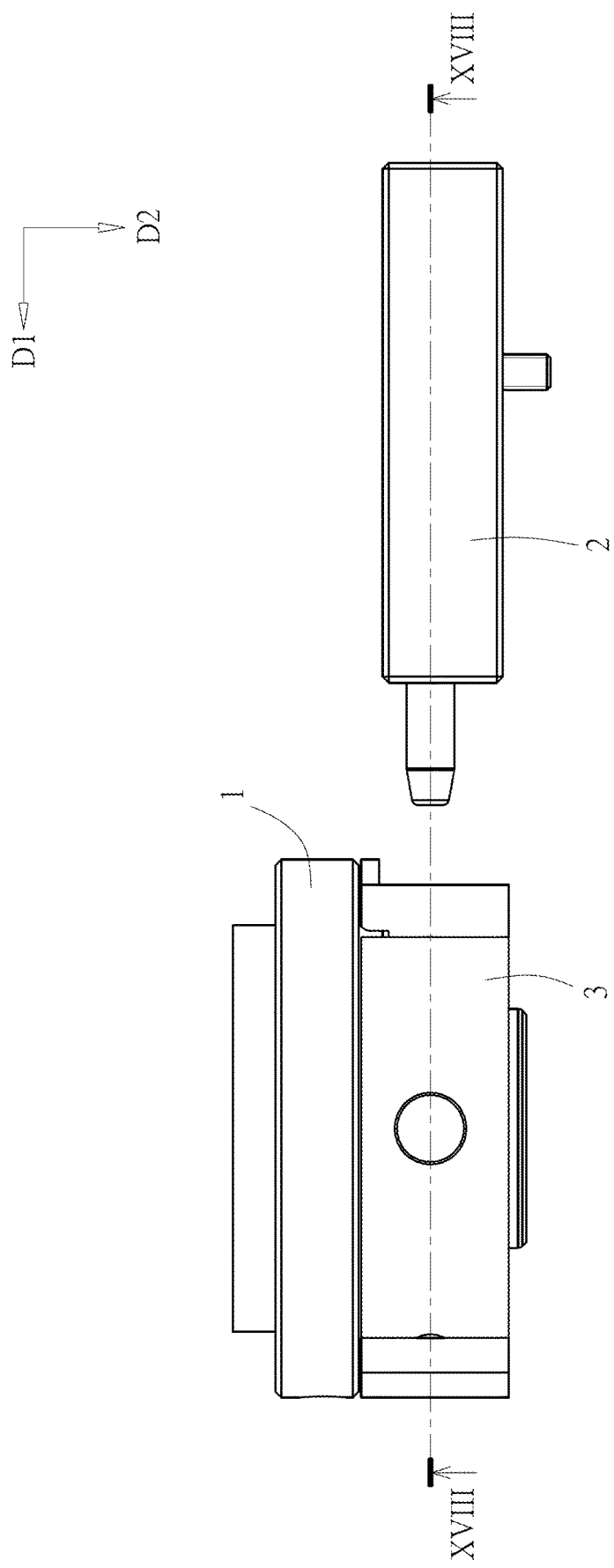
FIG. 17 is a side view according to the embodiment of the present invention, illustrating that the robot arm end shaft drives the first coupling unit and the second coupling unit to completely disengage from the tool changer gripper.
Figure 18:
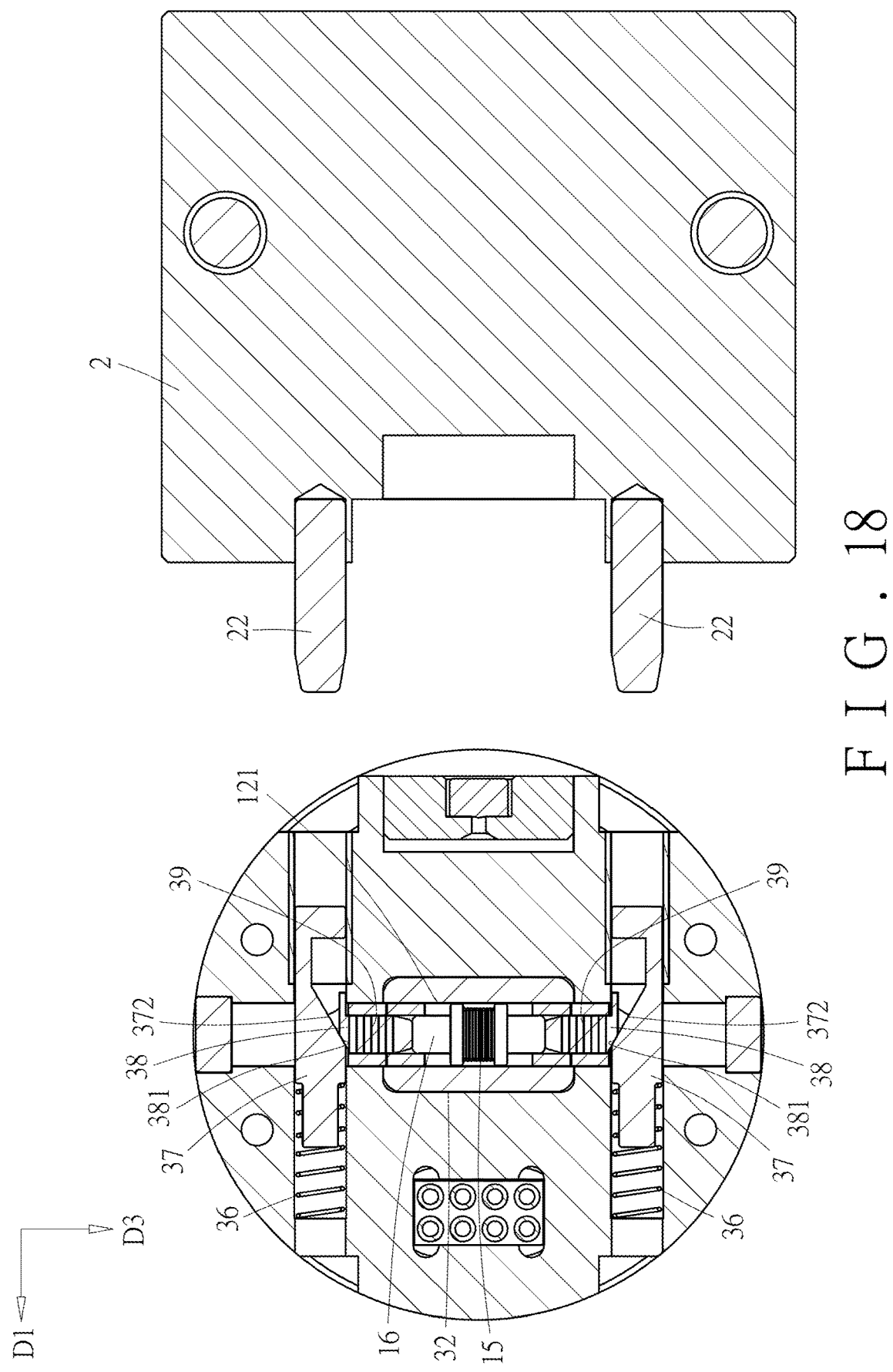
FIG. 18 is a cross-sectional view according to the embodiment of the present invention, illustrating that the robot arm end shaft drives the first coupling unit and the second coupling unit to completely disengage from the tool changer gripper.

Referring to FIGS. 16-18, the robot arm end shaft A further pulls the first coupling unit 1 and the second coupling unit 3 along the first direction D1 to be completely disengaged from the tool changer gripper 2. At this time, the second coupling unit 3 is completely disengaged from the protruding post 22 of the tool changer gripper 2 and can be driven by the robot arm end shaft A to work.

Figure 19:
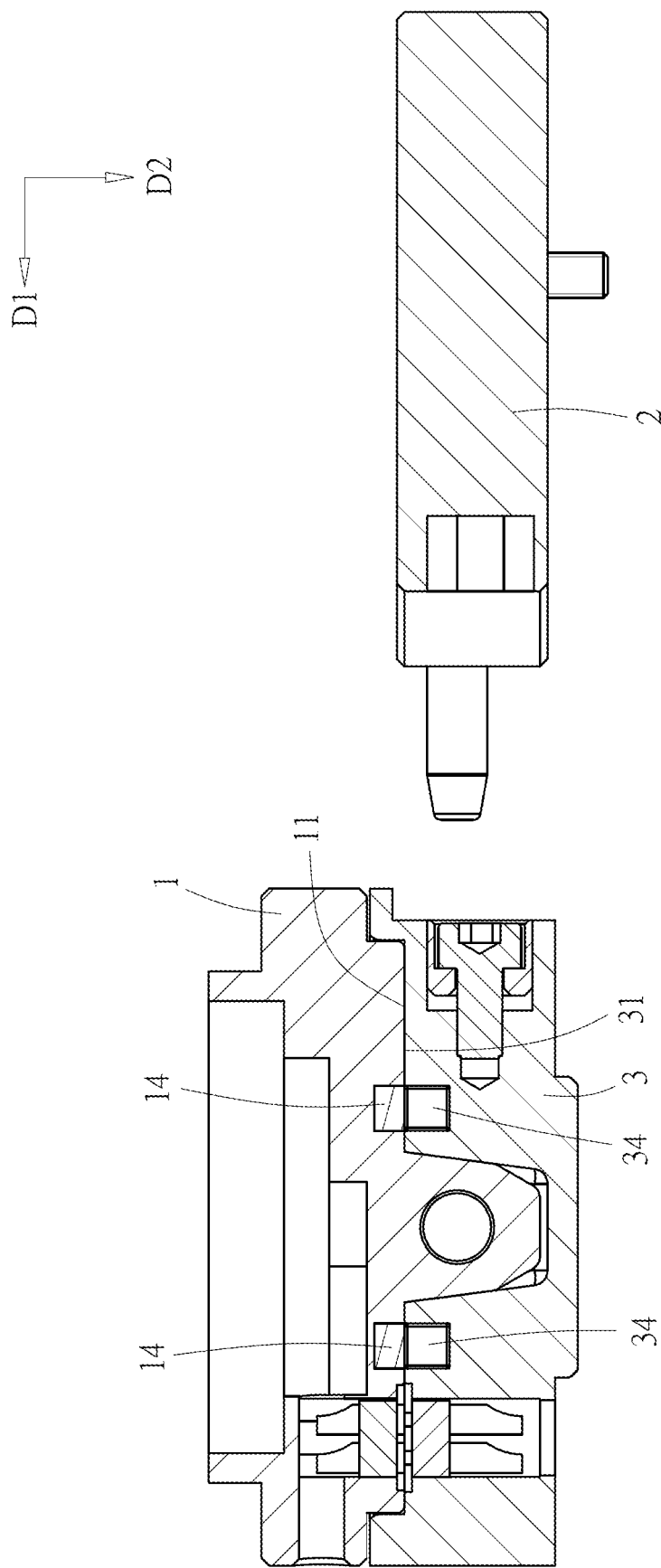
FIG. 19 is a cross-sectional view according to the embodiment of the present invention, illustrating that in the process that the robot arm end shaft drives the first coupling unit and the second coupling unit to disengage from the tool changer gripper, the first coupling unit and the second coupling unit are coupled to each other all the time through the magnetic coupling force between the first magnetic unit and the second magnetic unit, so that the first coupling unit and the second coupling unit are kept in precise alignment and firmly coupled.

Referring to FIG. 12A and FIG. 19, when the second coupling unit 3 and the tool changer gripper 2 are not completely separated or the first coupling unit 1 and the second coupling unit 3 are not completely fixed to each other, the first coupling unit 1 and the second coupling unit 3 can be coupled to each other through the magnetic coupling force between the first magnetic unit 14 and the second magnetic unit 34. The direction of the magnetic coupling force is different from the direction of the all-round mechanical locking. Specifically, the direction of the magnetic coupling force is different from the direction of the acting force of the first force-applying member 15 and the second force-applying member 36, so that the second coupling unit 3 can be disengaged from the tool changer gripper 2 in a stable manner, without shaking, vibration, or dislocation. The second coupling unit 3 is accurately aligned with and coupled to the first coupling unit 1. There is no need for the first coupling unit 1 to continue to exert a force for alignment with the second coupling unit 3. The configuration of the magnetism can be configured according to the weight of the second coupling unit 3 and the tool. According to requirements, both the first magnetic unit 14 and the second magnetic unit 34 may be magnets, alternatively, one of them may be a magnet, and the other may be a magnetically sensitive member.

Please refer to FIG. 4, FIG. 7 and FIG. 19. In the above embodiment, when the first coupling unit 1 approaches the second coupling unit 3 along the second direction D2 before the all-round mechanical locking is not achieved, the magnetic coupling force facilitates the protruding protrusion 12 of the first coupling unit 1 to be aligned and engaged with the groove 32 of the second coupling unit 3. Thus, the first coupling unit 1 and the second coupling unit 3 are coupled to each other through the magnetic coupling force. When the first coupling unit 1 and the second coupling unit 3 are moved away from the tool changer gripper 2 along the first direction D1, the magnetic coupling force still keeps the first coupling unit 1 and the second coupling unit 3 coupled to avoid accidental separation. Besides, in the separation process, the first coupling unit 1 and the second coupling unit 3 are synchronized to complete all-round mechanical locking. That is, in the present invention, in the process of performing the all-round mechanical locking, the magnetic coupling force keeps the first coupling unit 1 and the second coupling unit 3 coupled all the time.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A robotic tool changer system, comprising:
a first coupling unit, fixed to a robot arm end shaft and moved along with the robot arm end shaft, the first coupling unit including a first guide unit, a first locking unit and a first magnetic unit, the first guide unit having a first guide unit height;
a plurality of second coupling units, each of the second coupling units being connected with a respective tool, each of the second coupling units including a respective second guide unit, a respective second locking unit and a respective second magnetic unit;
a plurality of tool changer grippers, each of the second coupling units being detachably connected to a corresponding one of the tool changer grippers;
wherein when the first coupling unit is moved to approach a selected one of the second coupling units at a predetermined distance with respect to each other, the predetermined distance is defined as the first guide unit height, the first guide unit and the respective second guide unit of the selected one of the second coupling units jointly guide the first coupling unit and the selected one of the second coupling units to be aligned and engaged with each other, the first magnetic unit and the respective second magnetic unit are attracted to each other via magnetism within the predetermined distance between the first magnetic unit and the respective second magnetic unit to have a magnetic coupling force, the first coupling unit and the selected one of the second coupling units are coupled to each other by the magnetic coupling force, when the first coupling unit and the selected one of the second coupling units become coupled under the action of the magnetic coupling force, the first coupling unit and the selected one of the second coupling units become fixed to each other through all-round mechanical locking of the first locking unit and the respective second locking unit; and
the first guide unit is a protruding portion, the protruding portion has a first guide hole extending along a third direction, the first locking unit includes a first ejector pin disposed in the first guide hole, the first ejector pin has a first acting force; the respective second guide unit is a respective second guide groove corresponding to the protruding portion, each of the second locking units includes a respective second ejector pin and a respective guide lock, each of the second ejector pins is movably disposed in a corresponding one of the second coupling units in the third direction, each of the respective guide locks is movably disposed in a respective corresponding one of the second coupling units, and each of the guide locks is movable in a first direction, each of the guide locks is configured to move the respective one of the second ejector pins to extend out into the respective second guide groove or to retract from the respective second guide groove;
when the robot arm end shaft drives the first coupling unit to approach the selected one of the second coupling units in a second direction, the protruding portion is mated with the respective second guide groove so that the first coupling unit and the selected one of the second coupling units are aligned and engaged with each other, the first magnetic unit and the respective second magnetic unit generate the magnetic coupling force in the second direction to be coupled to each other;
when the robot arm end shaft pulls the first coupling unit and the selected one of the second coupling units to move away from the corresponding tool changer gripper along the first direction, an included angle is defined between the first direction and the second direction, the respective guide lock exerts a respective second acting force to overcome the first acting force to drive the respective second ejector pin to push the first ejector pin, and the respective second ejector pin extends into the first guide hole to perform the all-round mechanical locking for the first coupling unit and the selected one of the second coupling units to be fixed to each other.

2. The robotic tool changer system as claimed in claim 1, wherein the first magnetic unit and the respective second magnetic unit are magnets, or, one of the first magnetic unit and the respective second magnetic unit is a magnet and the other one of the first magnetic unit and the respective second magnetic unit is a magnetically sensitive member.

3. The robotic tool changer system as claimed in claim 1, wherein the tool changer grippers each include a respective third force-applying member and a respective at least one protruding post, and
wherein when the robot arm end shaft drives the first coupling unit and the selected one of the second coupling units to move along the first direction toward the corresponding tool changer gripper, the respective at least one protruding post pushes the respective guide lock to overcome the corresponding second acting force, the first ejector pin pushes the second ejector pin via the first acting force so that the second ejector pin is retracted from the respective second guide groove to release the all-round mechanical locking, the corresponding third force-applying member applies a respective third acting force to the selected one of the second coupling units so that the selected one of the second coupling units is held by the corresponding tool changer gripper, and the first coupling unit is released from the selected one of the second coupling units and is movable away from the selected one of the second coupling units along the second direction.

4. The robotic tool changer system as claimed in claim 3, wherein the first acting force, and each of the second acting forces are an elastic force and each of the third acting forces is a magnetic force.

5. The robotic tool changer system as claimed in claim 3, wherein each selected one of the second coupling units has a respective at least one guide lock groove to accommodate both the respective guide lock and a respective second force-applying member, each of the guide locks has a respective concave portion and a respective guide slope, each of the second ejector pins has a respective second ejector pin slope corresponding to the respective guide slope,
wherein when the selected one of the second coupling units is moved away from the corresponding tool changer gripper, the corresponding second force-applying member applies the corresponding second acting force to drive the respective guide lock, the respective guide slope of the respective guide lock pushes the respective second ejector pin slope of the respective second ejector pin, the respective second ejector pin extends out into the respective second guide groove to overcome the first acting force and to extend into the first guide hole; and wherein when the selected one of the second coupling units is moved toward the corresponding tool changer gripper, the respective at least one protruding post extends into the respective at least one guide lock groove, the respective at least one protruding post pushes the respective guide lock to overcome the corresponding second acting force, the first ejector pin pushes the respective second ejector pin via the first acting force to move toward the respective concave portion, so that the respective second ejector pin is disengaged from the first guide hole and retracted from the respective second guide groove.

6. The robotic tool changer system as claimed in claim 5, wherein a first force-applying member is provided in the first guide hole, and the first force-applying member applies the first acting force to the first ejector pin.

7. The robotic tool changer system as claimed in claim 1, wherein the first coupling unit includes a first contact surface, the first contact surface has a first recess, the first magnetic unit is embedded in the first recess, and the first magnetic unit is flush with the first contact surface; and wherein each of the second coupling units includes a respective second contact surface, each of the second contact surfaces has a respective second recess, each of the second magnetic units is embedded in a respective one of the second recesses, and each of the second magnetic units is flush with a respective one of the second contact surfaces.

8. The robotic tool changer system as claimed in claim 1, wherein a direction of the magnetic coupling force in the second direction is different from a plane defined by the first direction and the third direction.

* * * * *